(12) United States Patent
Hisaeda

(10) Patent No.: US 7,663,561 B2
(45) Date of Patent: Feb. 16, 2010

(54) WIRE CONNECTION STRUCTURE FOR LAMINATED GLASS AND LAMINATED GLASS INCLUDING SUCH A WIRE CONNECTION STRUCTURE

(75) Inventor: Katsumi Hisaeda, Chita-gun (JP)

(73) Assignee: Asahi Glass Company, Limited, Tokyo (JP)

( * ) Notice: Subject to any disclaimer, the term of this patent is extended or adjusted under 35 U.S.C. 154(b) by 264 days.

(21) Appl. No.: 11/860,140

(22) Filed: Sep. 24, 2007

(65) Prior Publication Data

US 2008/0024687 A1 Jan. 31, 2008

Related U.S. Application Data

(63) Continuation of application No. PCT/JP2006/304800, filed on Mar. 10, 2006.

(30) Foreign Application Priority Data

Mar. 24, 2005 (JP) .............................. 2005-086306

(51) Int. Cl.
*H01Q 1/32* (2006.01)
*H01R 13/62* (2006.01)
(52) U.S. Cl. ..................... 343/713; 343/906; 439/329
(58) Field of Classification Search ................ 343/704, 343/713, 905, 906; 439/329, 357
See application file for complete search history.

(56) References Cited

U.S. PATENT DOCUMENTS 5,307,076 A * 4/1994 Murakami et al. .......... 343/704

7,059,884 B2 6/2006 Hisaeda et al. ............. 439/329

FOREIGN PATENT DOCUMENTS

| EP | 0 542 473 A1 | 5/1993 |
| JP | 61-30102 A | 2/1986 |
| JP | 2-82701 A | 3/1990 |
| JP | 5-43608 | 6/1993 |
| JP | 2005-19083 A | 1/2005 |
| WO | WO 2004/049511 A1 | 6/2004 |

* cited by examiner

*Primary Examiner*—Michael C Wimer
(74) *Attorney, Agent, or Firm*—Oblon, Spivak, McClelland, Maier & Neustadt, L.L.P.

(57) ABSTRACT

There is provided a wire connection structure for laminated glass, which is capable of electrically connecting a conductor embedded in laminated glass and a lead wire without soldering, and laminated glass including such a wire connection structure.

A wire connection structure comprising an embedded electrode 8 embedded in laminated glass 1; a housing 2, 22 configured to form a space along with the laminated glass 1 and to have an insertion slot 13, 33 formed therein so as to communicate with the space, the housing being disposed on the laminated glass 1 so that the space confronts the embedded electrode 8; an elastic terminal 3, 23 received into the space of the housing 2, 22 and made of a conductive material; and a connector 5 connected to a lead wire 4; the terminal 3, 23 including a terminal strip 16, 36 to be detachably connected to the connector 5, and an external electrode 17, 37, the external electrode being configured to be electrostatic-capacitively coupled with the embedded electrode 8 when the terminal is received into the housing 2, 22 and is elastically deformed in the space to be pressed against the laminated glass.

8 Claims, 3 Drawing Sheets

US 7,663,561 B2

WIRE CONNECTION STRUCTURE FOR LAMINATED GLASS AND LAMINATED GLASS INCLUDING SUCH A WIRE CONNECTION STRUCTURE

TECHNICAL FIELD

The present invention relates to a wire connection structure for laminated glass, which connects, through electrostatic-capacitive coupling, an embedded electrode embedded in laminated glass and an external electrode to be connected to a lead wire, and laminated glass including such a wire connection structure.

BACKGROUND ART

There has been known a glass antenna, which adds an antenna function of receiving, e.g., AM, FM or TV waves to a window glass for automobiles by forming an antenna conductor in an antenna pattern for reception of electromagnetic waves in the window glass. Such a glass antenna is formed in a fixed window, such as a front windshield comprising laminated glass, or a rear windshield or a side windshield comprising tempered glass.

Laminated glass is prepared by bonding a plurality of glass sheets through an intermediate film. The antenna pattern is formed by, e.g., sealing an antenna conductor and an electrode connected to one end of the antenna conductor between glass sheets. There has been known a technique that an electrode embedded in the glass sheets (hereinbelow, referred to as the "embedded electrode"), and an electrode connected to a lead wire leading to an external electronic instrument and disposed on a surface of laminated glass (hereinbelow, referred to as the "external electrode") are confronted each other so that an electromagnetic wave, which is received by the antenna pattern, is transmitted to the lead wire through electrostatic-capacitive coupling between both electrodes (see, e.g., Patent Documents 1, 2 and 3).

The wire connection structure using such electrostatic-capacitive coupling does not need to take out the antenna conductor from an end face of the laminated glass in contrast to a wire connection structure wherein a lead wire disposed on the surface of laminated glass is directly connected to the antenna conductor embedded in laminated glass. Further, the wire connection structure using such electrostatic-capacitive coupling does not need to form a notch, which is required to expose an embedded electrode outside the laminated glass. As a result, the wire connection structure using such electrostatic-capacitive coupling needs no special handling for laminated glass and can prevent the formation of a notch from reducing the strength of the laminated glass.

FIG. 8 is a schematic perspective view showing a conventional wire connection structure for laminated glass directed to automobiles, which utilizes electrostatic-capacitive coupling. Laminated glass 51 comprises two glass sheets 56a and 56b bonded together through an intermediate film 57. The two glass sheets 56a and 56b have an antenna conductor 59 and an embedded electrode 58 interposed therebetween, and the glass sheet 56a has an external electrode 87 disposed thereon at such a position to confront the embedded electrode 58. The external electrode 87 is made of a baked silver paste. To the external electrode 87, a terminal 73, which is formed in a shape shown as flat Male Blade for Automobile (Symbol PA, PB) prescribed by JIS-D5403, is soldered. The antenna conductor 59 is connected to a lead wire 4 through electrostatic-capacitive coupling between the embedded electrode 58 and the external electrode 87 by connecting the terminal 73 to a connector 5 connected to the lead wire 4. The connector 5 is provided with a switch. The connector 5 can be disconnected from the terminal 73 by depressing the switch.

Patent document 1: JP-A-2-82701
Patent document 2: JP-A-61-30102
Patent document 2: JP-U-5-43608

DISCLOSURE OF THE INVENTION

The above-mentioned conventional wire connection structure needs operation for soldering the terminal 73 to the external electrode 87. The soldering operation is required to be conducted on a surface of the laminated glass 51 since the external electrode 87 is disposed on the surface of the laminated glass 51. In the above-mentioned conventional wire connection structure, since the heat generated during the soldering operation causes thermal stress in the laminated glass 51, there is a fear that the quality of the laminated glass is lowered.

Further, since the solder used for a window glass for automobiles usually contains lead, much work is needed in treating the solder containing lead at the time of disposing the glass. Further, since regulations to the use of lead-containing solder, such as the ELV (End Life of Vehicle) directive and the WEEE & RoHS (Waste Electrical and Electronic Equipment & Restriction of the use of certain Hazardous Substances in electrical and electronic equipment) directive set by the European Union, have started to be considered in many countries, it might be impossible in the future to use lead-containing solder.

In consideration of the above-mentioned problems, it is an object of the present invention to provide a wire connection structure for laminated glass, which is capable of electrically connecting a conductor embedded in laminated glass and a lead wire without soldering, and laminated glass including such a wire connection structure.

MEANS FOR SOLVING THE PROBLEMS

In order to solve the above-mentioned problems, the present invention provides a wire connection structure for laminated glass, which electrically connects a conductor embedded in laminated glass and a lead wire outside the laminated glass, comprising an embedded electrode embedded in the laminated glass and connected to the conductor; a housing configured to form a space along with the laminated glass and to have an insertion slot formed therein so as to communicate with the space, the housing being disposed on the laminated glass so that the space confronts the embedded electrode; an elastic terminal to be received into the space of the housing and made of a conductive material; a connector to be connected to the lead wire; and the terminal including a terminal strip to be detachably connected to the connector, and an external electrode, the external electrode being configured to be electrostatic-capacitively coupled with the embedded electrode when the terminal is received into the housing and is elastically deformed in the space to be pressed against the laminated glass; whereby when the connector is connected to the terminal strip, the lead wire and the conductor are electrically connected together through electrostatic-capacitive coupling between the embedded electrode and the external electrode.

The present invention also provides a laminated glass unit including a wire connection structure comprising laminated glass; a conductor embedded in the laminated glass; an embedded electrode embedded in the laminated glass and connected to the conductor; a housing configured to form a space along with the laminated glass and to have an insertion slot formed therein so as to communicate with the space, the housing being disposed on the laminated glass so that the space confronts the embedded electrode; an elastic terminal to be received into the space of the housing and made of a conductive material; and the terminal including a terminal strip to be detachably connected to a connector outside the laminated glass, and an external electrode, the external electrode being configured to be electrostatic-capacitively coupled with the embedded electrode when the terminal is received into the housing and is elastically deformed in the space to be pressed against the laminated glass.

The present invention is intended for stably connecting the external electrode to the embedded electrode by disposing the housing on the laminated glass, and receiving the terminal into the space formed by the housing with the terminal being elastically deformed. By adopting such arrangement, soldering becomes unnecessary, and parts can be easily exchanged.

It is preferred that the housing and the terminal be configured so that one of the housing and the terminal is fitted into or engaged with the other. When one of the housing and the terminal is fitted into or engaged with the other, it is possible to prevent the terminal from being separated by an external force. It is also possible to stably connect the external electrode and the embedded electrode through electrostatic-capacitive coupling. The conductor may comprise an antenna conductor. The laminated glass may comprise a window glass for a vehicle, and the housing may be disposed on a car-interior side.

EFFECTS OF THE INVENTION

The present invention as stated above offers the following effects. When the housing is disposed on laminated glass, followed by simply inserting the terminal, the external electrode can be pressed against the laminated glass by the elasticity of the terminal, with the result that it is possible to obtain stable electrostatic-capacitive coupling.

Since it is not necessary to print silver paste on the laminated glass and bake the printed paste for formation of the external electrode, it is possible to simplify the production process. Further, since the number of required parts is small and since the structure is simple, it is possible to simplify the production and to reduce the cost.

Further, since the conductor embedded in the laminated glass is electrically connected to the external electrode without use of solder, it is not necessary to take disposal of solder into account. Thus, the present invention contributes to restrain the cost of disposal. The present invention can prevent the strength of glass from being lowered by the thermal shock caused by soldering. The present invention can improve the appearance of the wire connection structure since the terminal is prevented from being exposed as in a case where the terminal is soldered.

Further, it is easy to adopt a shape complying with the standard prescribed in each country (such as, Japanese Industrial Standards in Japan) as the shape of the terminal strip of the terminal. Thus, it is possible to utilize a standardized connector, which has been used as a connector on the side of a lead wire. As a result, it is not necessary to procure new parts. Further, it is easy to repair parts.

Figure 1:
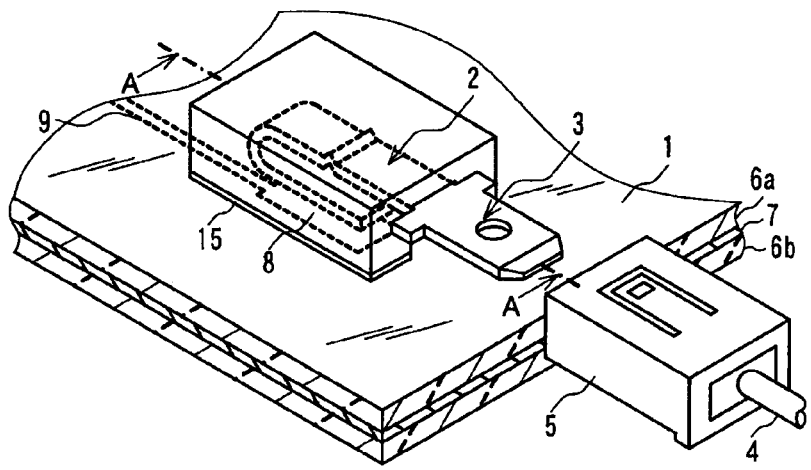
FIG. 1 is a perspective view showing an embodiment of the present invention.

EXPLANATION OF REFERENCE NUMERALS 1 and 51: Laminated glass
2 and 22: Housing
3 and 23: Terminal
4: Lead wire
5 and 25: Connector
6a and 6b: Glass sheet
7: Intermediate film
8 and 58: Embedded electrode
9 and 59: Antenna conductor (conductor)
12 and 32: Groove
13 and 33: Insertion slot
15: Adhesive layer
16: Terminal strip
17 and 37: External electrode
18 and 38: Coupling portion
19 and 39: Projection
20 and 40: Elastic portion
41: Through hole
42: Engageable portion
43: Stepped portion

BEST MODE FOR CARRYING OUT THE INVENTION

Now, embodiments of the present invention will be described in reference to the accompanying drawings.

Figure 2:
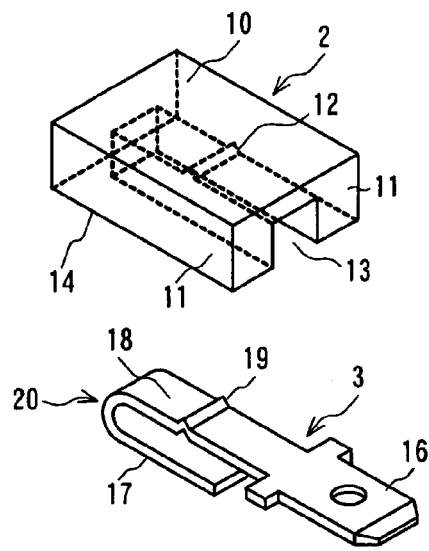
FIG. 2 is an exploded perspective view of the housing and the terminal shown in FIG. 1.
Figure 3:
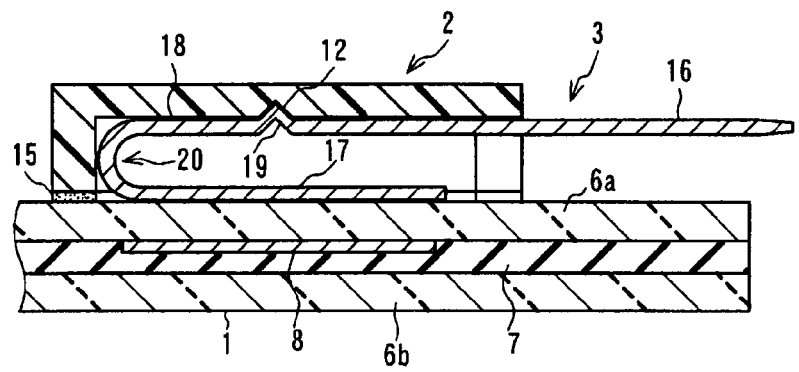
FIG. 3 is a cross-sectional view taking along line A-A of FIG. 1.
Figure 4:
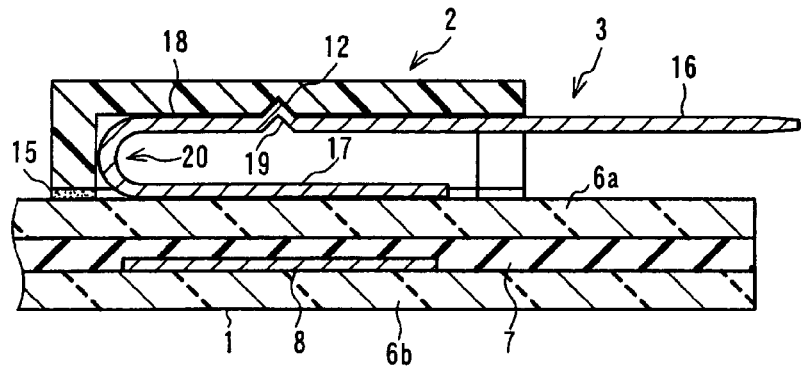
FIG. 4 is a cross-sectional view showing another embodiment, which is different from the embodiment of FIG. 1 in that an embedded electrode is located at a different position.

FIG. 1 is a perspective view showing an embodiment of the present invention. FIG. 2 is an exploded perspective view of a housing and a terminal. FIG. 3 is a cross-sectional view taking along line A-A of FIG. 1. FIG. 4 is a cross-sectional view showing another embodiment, which is different from the embodiment of FIG. 1 in that an embedded electrode is located at a different position. Each of the embodiments of the present invention comprises laminated glass 1, a housing 2, a terminal 3 and a connector 5, which is located on the side of a lead wire 4 connected to an external instrument. The laminated glass 1 shown in FIG. 1 and FIG. 3 comprises two glass sheets 6a and 6b bonded together through an intermediate film 7 made of, e.g., polyvinyl butyral, and an electrode (hereinbelow, referred to as the "embedded electrode 8") disposed between the two glass sheets 6a and 6b. The embedded electrode 8 has an antenna conductor 9 connected thereto to receive, e.g., AM, FM or TV waves.

The antenna conductor 9 embedded in the laminated glass 1 comprises, e.g., a conductor and may be embedded in the laminated in any method. For example, the antenna conductor 9 is formed by embedding a copper antenna wire in the intermediate film 7. The antenna conductor may be formed by bonding a film with an antenna pattern printed thereon, between the intermediate film 7 and the glass sheet 6a or between the intermediate film 7 and the glass sheet 6b. The antenna conductor may also be embedded in the laminated glass 1 by printing silver paste on a side of the glass sheet 6a in contact with the intermediate film 7 or a side of the glass sheet 6b in contact with the intermediate film 7 to form an antenna pattern. The antennal conductor 9 may serve to receive various kinds of electromagnetic waves according to applications for digital signals, analog signals or other signals. For example, the antennal conductor serves to receive an electromagnetic wave from a broadcasting station, an electromagnetic wave from a cell-phone, or an electromagnetic wave from a satellite.

The antenna conductor 9 includes the embedded electrode 8. The embedded electrode 8 may be disposed at any position in the laminated glass 1. However, it is preferred in consideration of connection with the lead wire for connection with an external instrument that the embedded electrode be disposed at a peripheral portion. The size and the form of the embedded electrode 8 are properly determined according to applications. The embedded electrode 8 and the antenna conductor 9 may be integrally formed by punching, e.g., copper foil. The embedded electrode 8 and the antenna conductor 9 may be separately formed.

The embedded electrode 8 is disposed at the interface of the glass sheet 6a and the intermediate film 7 as shown in FIG. 3 (the cross-sectional view taking long line A-A). In this case, the glass sheet 6a, which is located between the embedded electrode 8 and an external electrode 17, serves as a dielectric substance. The embedded electrode 8 may be disposed at the interface of the glass sheet 6b and the intermediate film 7 as shown in the cross-sectional view of FIG. 4. In the latter case, the glass sheet 6a and the intermediate film 7, which are located between the embedded electrode 8 and the external electrode 17, serve as dielectric substances.

The housing 2 is mounted at a position to confront the embedded electrode 8 through the glass sheet 6a. The housing 2 includes a top wall 10 and a lateral wall 11 vertically extending from a peripheral portion of the top wall 10. The top wall 10 and the lateral wall 11 form a space between a lower surface of the top wall 10 and the glass sheet 6a. The top wall 10 has a groove 12 formed in the vicinity of the center of the lower surface facing the space. The housing has an insertion slot 13 formed therein as an inlet for receiving the terminal 3 by forming a notch as a passage in a portion of the lateral wall. The housing 2 has an adhesive layer 15 on a bonding side 14 of the lateral wall 11 opposite the top wall 10. The housing is fixed to the laminated glass 1 through the adhesive layer 15.

The terminal 3 is made of a conductive material and comprises a terminal strip 16 for connection with the connector 5 on the side of the lead wire 4, the external electrode 17 for electrostatic-capacitive coupling with the embedded electrode 8 formed in the laminated glass, and a coupling portion 18 for press-fitting the external electrode 17 to the laminated glass 1 in order to hold the terminal 3 in the housing. The terminal strip 16 is formed in a shape shown as Symbol PA, PB prescribed by JIS-D5403. The coupling portion 18 is formed to be continuous with the terminal strip 16 and has a projection 19 formed on an upper side thereof so as to be engageable with the groove 12 of the housing 2. The external electrode 17 is connected to the coupling portion 18 through an elastic portion 20. The elastic portion 20 is formed by holding a plate-like member and has elasticity in a vertical direction with respect to the external electrode 17. The height of the elastic portion 20 in a free space is determined to be equal to or slightly greater than the height of the space defined by the housing 2 and the laminated glass 1.

When the housing 2 is fixed to the laminated glass 1, the housing 2 is positioned so that the space formed in the housing 2 for housing the terminal 3 is located at a position to cause the external electrode 17 of the terminal 3 to confront the embedded electrode 8 in the laminated glass 1 through the glass sheet 6a. Then, the housing 2 and the laminated glass 1 are firmly fixed each other through the adhesive layer 15.

The terminal 3 and the housing 2 are connected together by utilizing the elasticity of the elastic portion 20. The terminal 3 is thrusted into the insertion slot 13 with the coupling portion 18 being pressed to elastically deform the elastic portion 20 until the production 19 of the coupling portion 18 is engaged with the groove 12 of the housing 2 and fixed in the groove. The engagement between the groove 12 and the projection 19 serves for positioning and fixing of the terminal 3 and the housing 2. By the reaction force of the elastic portion 20, the coupling portion 18 is pressed against the top wall 10 of the housing 2, the external electrode 17 is pressed against a surface of the laminated glass 1, and the housing 2 and the terminal 3 are firmly fixed together. By the reactive force of the elastic portion 20, the external electrode 17 is firmly pressed against the laminated glass 1 to have electrostatic-capacitive coupling with the embedded electrode 8 in a stable manner. In accordance with the present invention, it is possible to electrically connect the embedded electrode 8 and the terminal 3 without use of solder.

On the other hand, the connector 5 on the side of the lead wire 4 is a female connector complying with Double Plug Receptacle for Automobile (Symbol CW) prescribed by JIS-D5403, which has been conventionally used. By connecting this connector to the terminal strip 16 of the terminal 3, the lead wire 4 and the embedded electrode 8 in the laminated glass 1 are connected together. In this way, the lead wire 4 and the antenna conductor 9 are connected together through electrostatic-capacitive coupling. Thus, an electromagnetic wave received by the antenna conductor 9 is taken out through the electrostatic-capacitive coupling between the external electrode 17 and the embedded electrode 8 and transmitted to an electronic device connected to the lead wire 4.

Figure 5:
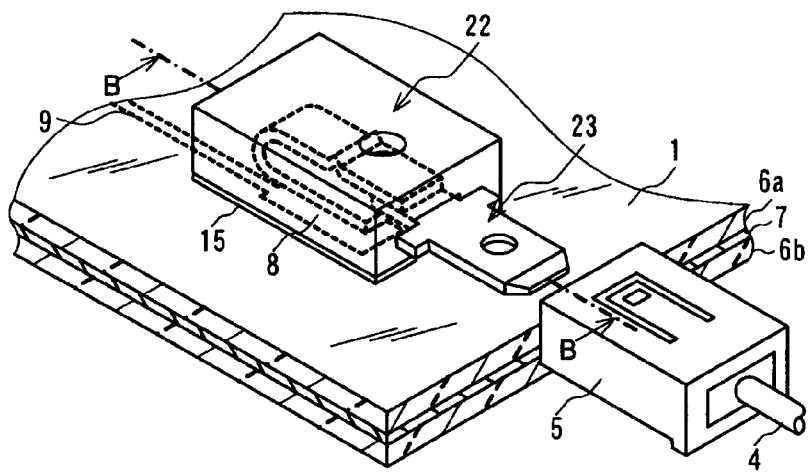
FIG. 5 is a perspective view showing another embodiment of the present invention, wherein a coupling structure is modified.
Figure 6:
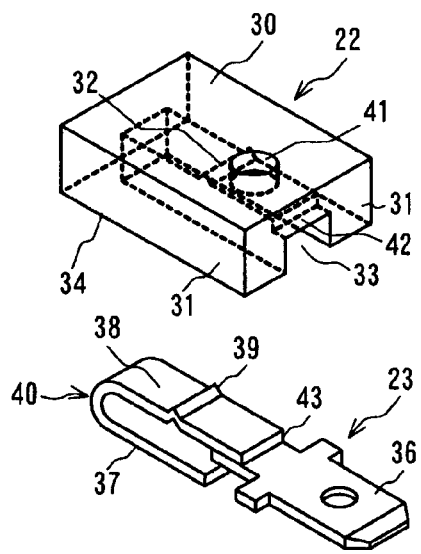
FIG. 6 is an exploded perspective view of the housing and the terminal shown in FIG. 5.
Figure 7:
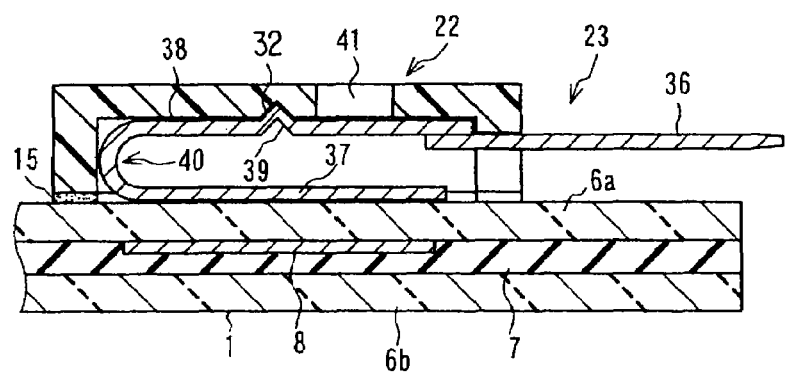
FIG. 7 is a cross-sectional view taking along line B-B of FIG. 5.
Figure 8:
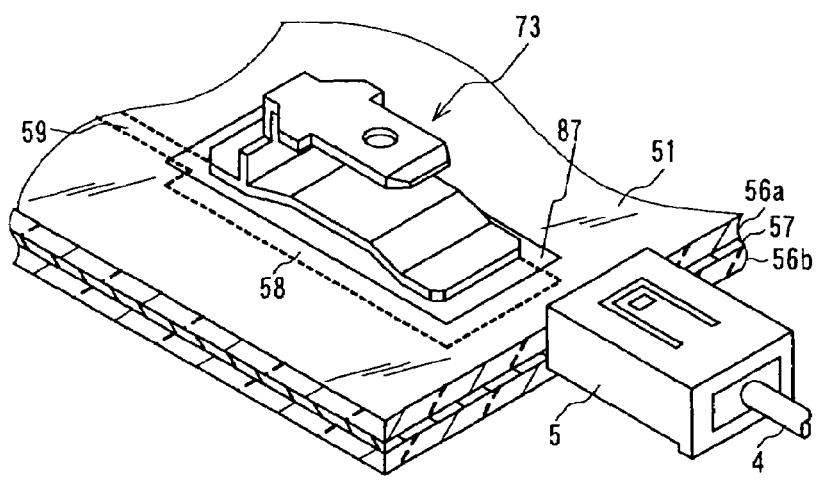
FIG. 8 is a perspective view showing a conventional wire connection structure.

FIGS. 5, 6 and 7 show a modified embodiment of the present invention, wherein the coupling structure for the terminal and the housing shown in FIG. 1 is modified. FIG. 5 is a perspective of the modified embodiment, FIG. 6 is an exploded perspective view of the housing and the terminal in the modified embodiment, and FIG. 7 is a cross-sectional view taken along line B-B of FIG. 5. In FIGS. 5, 6 and 7, the same parts as those in FIGS. 1, 2, 3 and 4 are indicated by the same reference numerals. The laminated glass 1, the embedded electrode 8, the antenna conductor 9 and the connector 5 on the side of the lead wire 4 connected to an external instrument, excluding a housing 22 and a terminal 23, are the same as those shown in FIG. 1.

As in the embodiment shown in FIG. 1, the housing 22 is mounted at a position to confront the embedded electrode 8 through the glass sheet 6a. The housing 22 includes a top wall 30, and a lateral wall 31 vertically extending from a peripheral portion of the top wall 30. The top wall 30 and the lateral wall 31 form a space between a lower surface of the top wall 30 and the glass sheet 6a. The top wall 30 has a groove 32 formed in the vicinity of the center of the lower surface facing the space. The housing has an insertion slot 33 formed therein as an inlet for receiving the terminal 23 by forming a notch as a gateway in a portion of the lateral wall 31. The housing 22 also has a through hole 41 formed in a substantially central portion of the top wall 30 and an engageable portion 42 formed by reducing the height of the insertion slot 33 to form a step on a portion of the inner surface of the housing 22 close to the lateral wall. The housing 22 has an adhesive layer 15 formed on a bonding surface 34 of the lateral wall 31 opposite the top wall 30. The housing is fixed to the laminated glass 1 through the adhesive layer 15.

The terminal 23 is made of a conductive material and comprises a terminal strip 36 for connection with the connector 5 on the side of the lead wire 4, an external terminal 37 for electrostatic-capacitive coupling with the embedded electrode 8 formed in the laminated glass 1, and a coupling portion 38 for pressing the external electrode 37 against the laminated glass 1 to hold the terminal 23 in the housing. The terminal strip 36 is formed in a shape shown as Symbol PA, PB of JIS-D54039. The coupling portion 38 is formed to be continuous with an upper side of the terminal strip 36 so as to form a stepped portion 43 to be engageable with the engageable portion 42 of the housing 22. The coupling portion 38 includes a projection 39 engageable with a groove 32 of the housing 22, and an elastic portion 40. The external electrode 37 is formed to be continuous with the coupling portion 38 through the elastic portion 40. The elastic portion 40 may be formed by holding a plate-like member. The elastic portion has elasticity in a vertical direction with respect to the external electrode 37. The height of the elastic portion 40 in a free space is determined so as to be equal to or slightly greater than the height of the space defined by the housing 22 and the laminated glass 1.

When the housing 22 is fixed to the laminated glass 1, the housing 22 is positioned with respect to the laminated glass 1 so that the space formed in the housing 22 for housing the terminal 23 is located at a position to cause the external electrode 37 of the terminal 23 to confront the embedded electrode 8 in the laminated glass 1 through the glass sheet 6a. Then, the housing 22 and the laminated glass 1 are firmly fixed each other through the adhesive layer 15.

The terminal 23 and the housing 22 are connected together by utilizing the elasticity of the elastic portion 40. The terminal 23 is thrusted into the insertion slot 33 with the coupling portion 38 being depressed to elastically deform the elastic portion 40 until the projection 39 of the coupling portion 38 is engaged with the groove 32 of the housing 22 and are fixed together. The engagement between the groove 32 and the projection 39 also serves for positioning. When the terminal 23 is thrusted into the housing 22 until the projection 39 is engaged with the groove 32, the stepped portion 43 of the terminal 23 is engaged with the engageable portion 42 of the housing 22. Thus, even if a force is applied in a direction to pull the terminal 23 out of the housing 22, the terminal 23 is difficult to be pulled out of the housing 22. Further, the coupling portion 38 is pressed against the top wall 30 of the housing 22 by the reaction force of the elastic portion 40. Simultaneously, the external electrode 37 is pressed against a surface of the laminated glass 1 to firmly fix the terminal 23 to the housing 22. As stated above, by the reaction force of the elastic portion 40, the external electrode 37 is firmly pressed against the laminated glass 1 to have electrostatic-capacitive coupling with the embedded electrode 8 in a stable manner as in the embodiment shown in FIG. 1. The housing 22 and the terminal 23 can be more firmly connected together.

It should be noted that when the terminal 23 is depressed through the through-hole 41, the terminal 23 is disengaged from the housing 22. When the terminal 23 is pulled in the direction opposite to the insertion direction with the terminal 23 being depressed, the terminal can be removed from the housing 22.

In the embodiments stated above, the shape and the size of each of the housings 2 and 22 and the terminals 3 and 23 are not limited to those stated above. For example, each of the housings 2 and 22 may be formed in an outer shape having rounded ridges so as to be prevented from being jammed even if an external force is applied or may be formed in a chevron outer shape to have a good design. Each of the housings 2 and 22 may be painted to have a good appearance. Each of the housings 2 and 22 may be configured so as to receive a plurality of terminals 3 and 23. The fitting/engaging structure between the housing 2 or 22 and the terminal 3 or 23 is not limited to those shown in FIG. 2 and FIG. 6.

There is no limitation to the material for each of the housings 2 and 22. The material for each of the housings is determined in consideration of durability and adhesion with a bonding material forming the adhesive layer 15. A preferred example of the material for each of the housings is a polyamide resin. There is no limitation to the method for manufacturing each of the housings. Each of the housings may be prepared by cutting work or injection molding.

Examples of the adhesive layer 15 include a double-sided adhesion material (double-sided tape), a thermosetting adhesive and a thermoplastic adhesive. As the material for the adhesive layer, one having a sufficient durability for long-term use with respect to the elasticity of the elastic portion 20 or 40 of the terminal 3 or 23 is selected. When a double-sided adhesion material is used, the thickness of the adhesive layer is determined so as to be capable of utilizing the elasticity of the elastic portion 20 or 40 in consideration of the size of the terminal 3 or 23. When an adhesive is used, an attention needs to be paid so as to prevent the adhesive from leaking onto the laminated glass 1 and to prevent the generation of a gas, which can affect the durability of the terminal 3 or 23. It is preferred to use a double-sided adhesive material in terms of mass productivity and workability.

There is no limitation to the material for the terminals 3 and 23 as long as each of the terminals is made of a conductive material. However, it is preferred in consideration of long-term stability and compatibility with the embedded electrode 8 that at least each of the external electrodes 17 and 37 be plated with metal, such as gold, silver, tin or nickel. It is recommended that metal plating be performed in consideration of environment effect caused by disposal.

The size of the area of the confronting surfaces of each of the external electrodes 17 and 37 of the terminals 3 and 23 and the embedded electrode 8 is properly determined according to the distance between each of the external electrodes 17 and 37 and the embedded electrode 8. It is possible to obtain performance having sufficient electrostatic-capacitive coupling by increasing the area as the thickness of the glass sheet 6a of the laminated glass increases or decreasing the area as the thickness of the glass sheet 6a decreases.

When the laminated glass 1 is applied to a vehicle, the glass sheet 6a is located on a car-interior-side, and each of the housings 2 and 22 is located at a certain position on a surface of the laminated glass 1 on the car-interior-side.

Although the above-mentioned embodiments have been explained about a case where the conductor comprises an antenna conductor, the present invention is also applicable to other applications, such as a case where the conductor comprises a conductor for transmitting a signal detected by a sensor.

INDUSTRIAL APPLICABILITY

As described above, in accordance with the present invention, it is possible to provide a wire connection structure for laminated glass, which is capable of electrically connecting a conductor embedded in laminated glass and a lead wire through electrostatic-capacitive coupling by using a conventional connector.

The entire disclosure of Japanese Patent Application No. 2005-86306 filed on Mar. 24, 2005 including specification, claims, drawings and summary is incorporated herein by reference in its entirety.

What is claimed is:

1. A wire connection structure for laminated glass, which electrically connects a conductor embedded in laminated glass and a lead wire outside the laminated glass, comprising:
   an embedded electrode embedded in the laminated glass and connected to the conductor;
   a housing configured to form a space along with the laminated glass and to have an insertion slot formed therein so as to communicate with the space, the housing being disposed on the laminated glass so that the space confronts the embedded electrode;
   an elastic terminal to be received into the space of the housing and made of a conductive material;
   a connector to be connected to the lead wire; and
   the terminal including a terminal strip to be detachably connected to the connector, and an external electrode, the external electrode being configured to be electrostatic-capacitively coupled with the embedded electrode when the terminal is received into the housing and is elastically deformed in the space to be pressed against the laminated glass;
   whereby when the connector is connected to the terminal strip, the lead wire and the conductor are electrically connected together through electrostatic-capacitive coupling between the embedded electrode and the external electrode.

2. The wire connection structure according to claim 1, wherein the housing and the terminal are configured so that one of the housing and the terminal is fitted into or engaged with the other.

3. The wire connection structure according to claim 1, wherein the conductor comprises an antenna conductor.

4. The wire connection structure according to claim 1, wherein the laminated glass comprises a window glass for a vehicle, and the housing is disposed on a car-interior side.

5. A laminated glass unit including a wire connection structure comprising:
   laminated glass;
   a conductor embedded in the laminated glass;
   an embedded electrode embedded in the laminated glass and connected to the conductor;
   a housing configured to form a space along with the laminated glass and to have an insertion slot formed therein so as to communicate with the space, the housing being disposed on the laminated glass so that the space confronts the embedded electrode;
   an elastic terminal to be received into the space of the housing and made of a conductive material; and
   the terminal including a terminal strip to be detachably connected to a connector outside the laminated glass, and an external electrode, the external electrode being configured to be electrostatic-capacitively coupled with the embedded electrode when the terminal is received into the housing and is elastically deformed in the space to be pressed against the laminated glass.

6. The laminated glass according to claim 5, wherein the housing and the terminal are configured so that one of the housing and the terminal is fitted into or engaged with the other.

7. The laminated glass according to claim 5, wherein the conductor comprises an antenna conductor.

8. The laminated glass according to claim 5, wherein the laminated glass comprises a window glass for a vehicle, and the housing is disposed on a car-interior side.

* * * * *